(12) United States Patent
Haring

(10) Patent No.: US 11,085,231 B2
(45) Date of Patent: Aug. 10, 2021

(54) INSULATING GLASS UNIT WITH ILLUMINATION DEVICE

(71) Applicant: Glass Technology GmbH, Vienna (AT)

(72) Inventor: Heinz Haring, Vienna (AT)

(73) Assignee: Glass Technology GmbH, Vienna (AT)

( * ) Notice: Subject to any disclaimer, the term of this patent is extended or adjusted under 35 U.S.C. 154(b) by 0 days.

(21) Appl. No.: 16/764,635

(22) PCT Filed: Nov. 14, 2018

(86) PCT No.: PCT/EP2018/081276
§ 371 (c)(1),
(2) Date: May 15, 2020

(87) PCT Pub. No.: WO2019/096872
PCT Pub. Date: May 23, 2019

(65) Prior Publication Data
US 2020/0408033 A1    Dec. 31, 2020

(30) Foreign Application Priority Data

Nov. 17, 2017  (DE) ..................... 10 2017 220 646.2
Feb. 1, 2018   (DE) ..................... 10 2018 102 263.8
Mar. 6, 2018   (DE) ..................... 10 2018 105 127.1

(51) Int. Cl.
*B32B 17/10* (2006.01)
*E06B 3/66* (2006.01)
(Continued)

(52) U.S. Cl.
CPC .... *E06B 3/66376* (2013.01); *B32B 17/10036* (2013.01); *B32B 17/10541* (2013.01);
(Continued)

(58) Field of Classification Search
CPC ........ B32B 17/10036; B32B 17/10541; B32B 2605/00; E06B 2003/66385;
(Continued)

(56) References Cited

U.S. PATENT DOCUMENTS 5,197,242 A  *  3/1993  Baughman  ........ B32B 17/10045
                                                52/171.3
9,250,382 B2 *  2/2016  Ayoub  .................. G02B 6/0065
(Continued)

OTHER PUBLICATIONS

PCT—Application: PCT/EP2018/081276 filed Nov. 14, 2018—International Preliminary Report on Patentability dated May 28, 2020.
(Continued)

*Primary Examiner* — Arman B Fallahkhair
(74) *Attorney, Agent, or Firm* — Simmons Perrine Moyer Bergman PLC

(57) ABSTRACT

An insulating glass unit (10) is formed from a plurality of transparent layers (16, 18, 20), in which at least one illuminable panel (20) is arranged between at least two mineral glass panels (16, 18). The mineral glass panels (16, 18) are held at a defined distance from one another by at least one spacer element (14). The illuminable panel (20) is held at least on one longitudinal marginal edge (24) by the spacer element (14). The spacer element (14) is formed by at least one hollow profile (15), which preferably comprises a plurality of adjoining hollow chambers (26, 28). The outer mineral glass panels (16, 18) each adjoins at least two lateral surfaces of the hollow profile (15). The illuminable panel (20) rests on or against the intermediate hollow chamber (28). An illumination element (32) is arranged within the intermediate hollow chamber (28).

27 Claims, 8 Drawing Sheets

(51) Int. Cl.
  *F21V 8/00* (2006.01)
  *G09F 13/22* (2006.01)
  *E06B 3/663* (2006.01)

(52) U.S. Cl.
  CPC .......... *E06B 3/6612* (2013.01); *E06B 3/6617* (2013.01); *E06B 3/66319* (2013.01); *E06B 3/66366* (2013.01); *G02B 6/009* (2013.01); *G02B 6/0085* (2013.01); *G02B 6/0091* (2013.01); *G02B 6/0095* (2013.01); *G09F 13/22* (2013.01); *B32B 2605/00* (2013.01); *E06B 2003/66385* (2013.01); *E06B 2003/66395* (2013.01); *G09F 2013/225* (2013.01)

(58) Field of Classification Search
  CPC .......... E06B 2003/66395; E06B 3/6612; E06B 3/6617; E06B 3/66319; E06B 3/66366; E06B 3/66376; G02B 6/0085; G02B 6/009; G02B 6/0091; G02B 6/0095; G09F 13/22; G09F 2013/225
  See application file for complete search history.

(56) References Cited

U.S. PATENT DOCUMENTS

| | | | | |
|---|---|---|---|---|
| 9,500,354 | B2* | 11/2016 | Gierens | .................... E06B 3/66 |
| 9,864,125 | B2* | 1/2018 | Gierens | ............. B32B 17/10036 |
| 2004/0040228 | A1* | 3/2004 | Emde | ................ B32B 17/10165 52/173.3 |
| 2007/0177391 | A1 | 8/2007 | Davis et al. | |
| 2017/0177391 | A1* | 6/2017 | Wagner | ............... G06F 11/3668 |

OTHER PUBLICATIONS

PCT—Application: PCT/EP2018/081276 filed Nov. 14, 2018—International Search Report dated Feb. 27, 2019.

\* cited by examiner

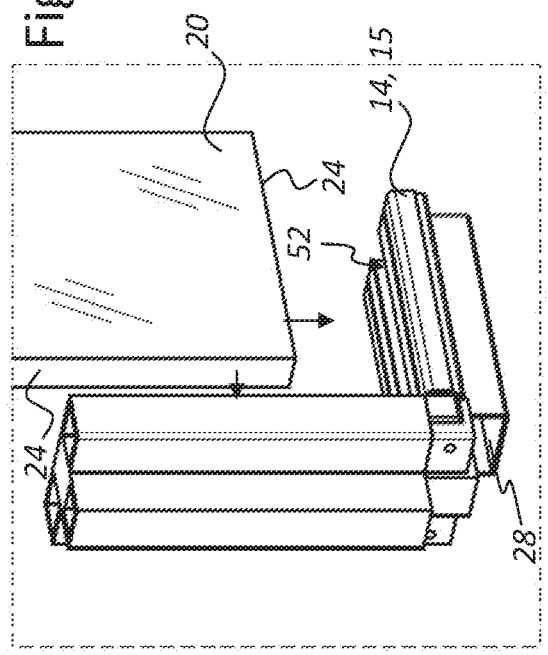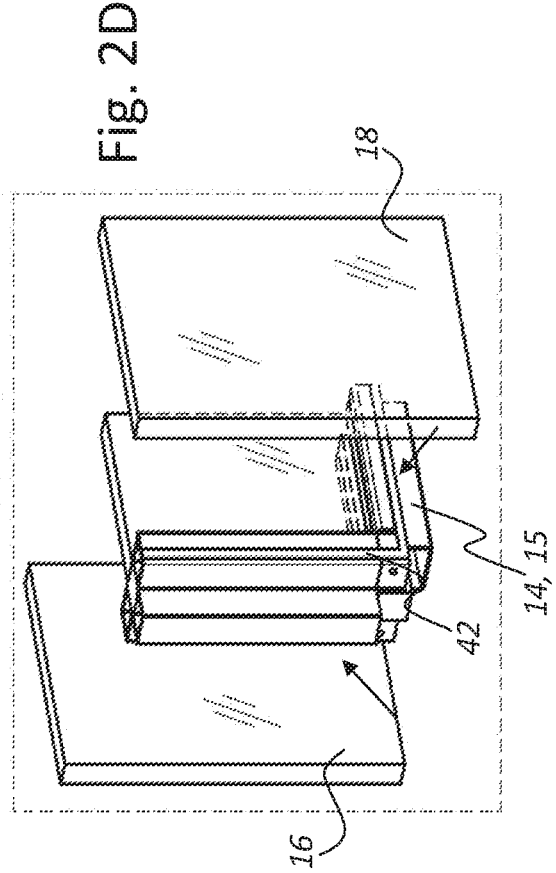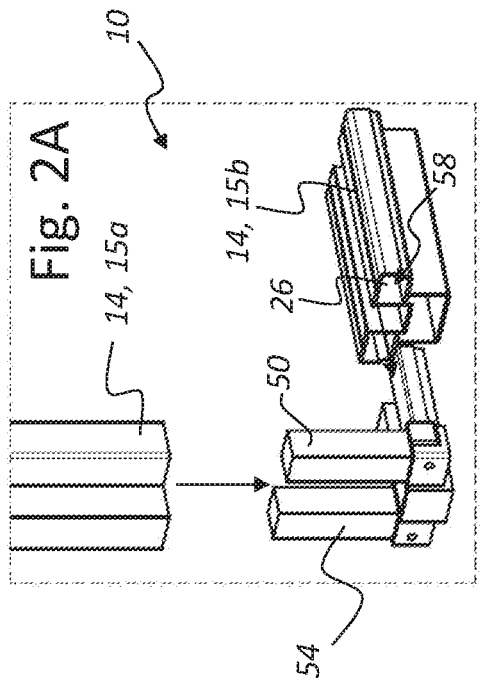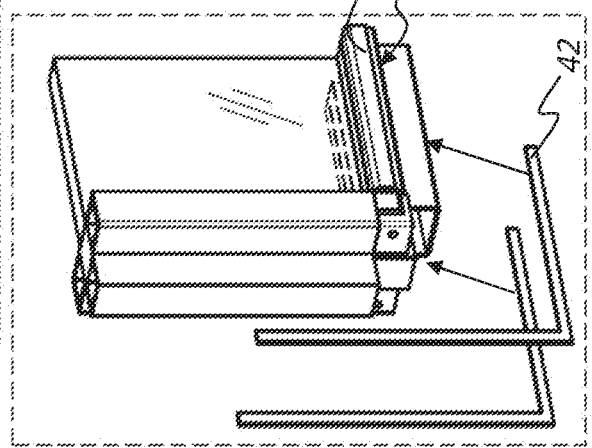

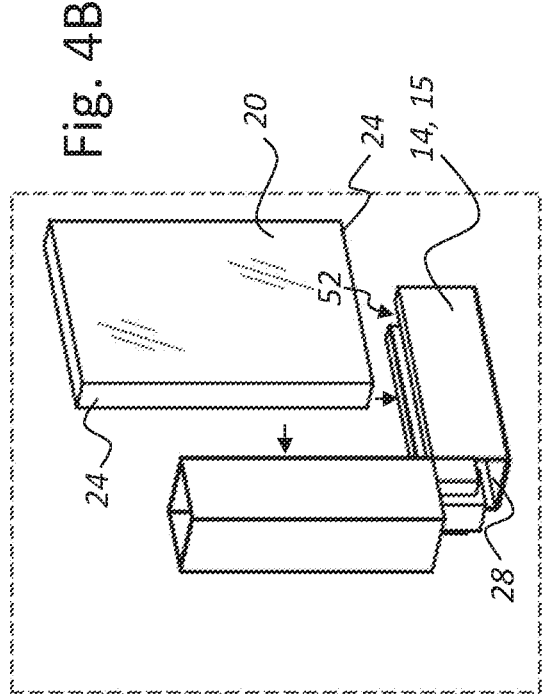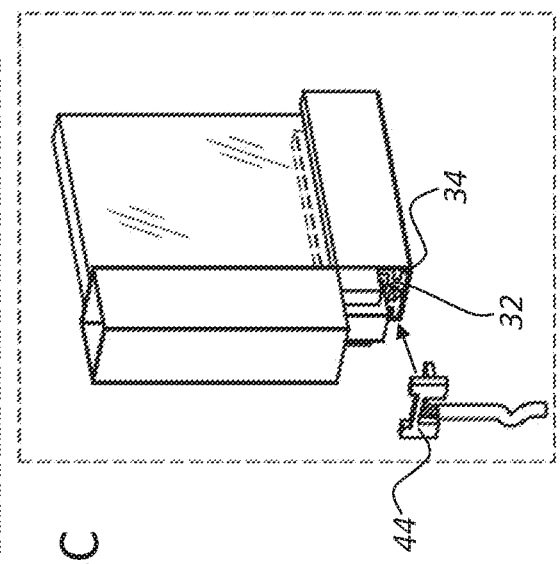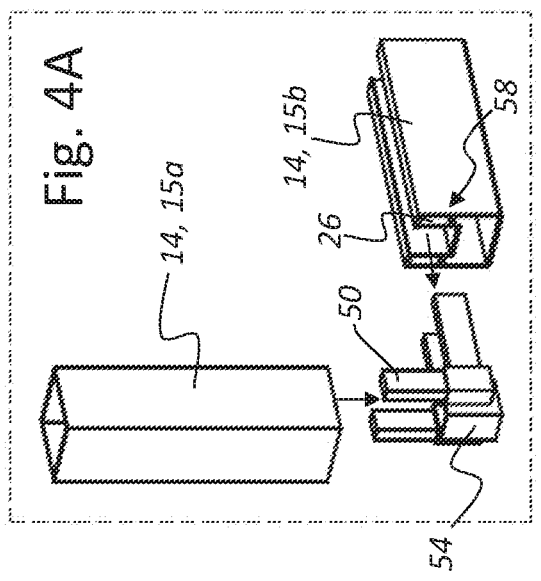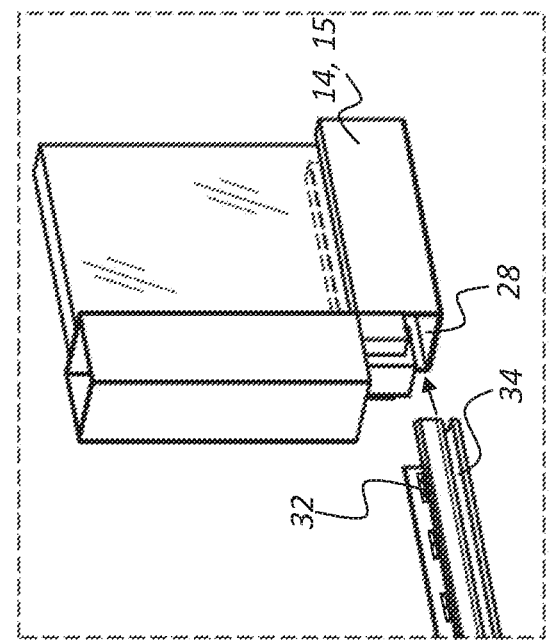

INSULATING GLASS UNIT WITH ILLUMINATION DEVICE

CLAIM OF PRIORITY

The present application claims priority to International Application PCT/EP2018/081276, filed Nov. 14, 2018, which in turn claims priority to German Application 10 2018 105 127.1, filed Mar. 6, 2018, German Application 10 2018 102 263.8, filed Feb. 1, 2018, and German Application 10 2017 220 646.2, filed Nov. 17, 2017, which are incorporated by reference.

FIELD OF THE INVENTION

The present invention relates to an insulating glass unit made from a plurality of transparent layers and having the features of the independent claim 1, in which insulating glass unit at least one illuminable panel of transparent material is arranged between at least two mineral glass panels, which at least two mineral glass panels are held at a defined distance from one another by a spacer element.

BACKGROUND OF THE INVENTION

A glass unit made of several transparent layers, in which an illuminable panel of transparent material is arranged between at least two glass panels, which are held at a defined distance from one another by a spacer element, is described in EP 2 852 855 B1. An LED-illuminated glass insulating panel is disclosed there, in which two glass substrates spaced apart from one another are held together and/or spaced apart from one another by a spacer profile, which spacer profile has upper-side holding means for holding an illuminable intermediate substrate and lower-side cooling fins for dissipating heat, which heat is generated by the at least one light source associated with the spacer profile.

SUMMARY OF THE INVENTION

In view of this solution known from the prior art, it can be regarded as the primary aim of the present invention to provide an insulating glass unit made of several transparent layers with an illuminable panel made of transparent material, which offers a universally mountable and quickly and easily changeable or modifiable illumination possibility without the insulating properties of the entire unit being affected or impaired in any way when the illumination is changed.

This objective of the invention is achieved with the object of the independent claim. Features of advantageous further embodiments of the invention are described in the dependent claims.

In order to achieve the said objective, the invention proposes an insulating glass unit formed of a plurality of transparent layers, in which at least one illuminable panel of transparent material is arranged between at least two mineral glass panels, which mineral glass panels are held at a defined distance from one another by a spacer element. The glass panels mentioned can be standard mineral glass or normal glass, but the use of plastic glass, for example, is also possible. In principle, the use of organic glass or inorganic glass is possible. This illuminable panel is held and/or supported at least at one longitudinal marginal edge by or through the spacer element, optionally the illuminable panel is only stabilized there in its position, wherein as a rule a parallel arrangement of the at least two mineral glass panels is provided, which are normally also arranged parallel to one another other and spaced apart from one another. The spacer element, which defines or at least partially determines the distance between the at least two mineral glass panels, is formed by at least one hollow profile. Preferably, the at least one hollow profile comprises several adjoining hollow chambers.

Furthermore, the insulating glass unit according to the invention provides that an outer mineral glass panel each adjoins and/or abuts to at least two lateral surfaces of the hollow profile, preferably to the at least two lateral hollow chambers, optionally adjoining and/or abutting to an additional insulating layer inserted hereinto or to a spacer arranged there, which spacer is made of any material such as e.g. aluminum, plastic, chromium-nickel steel, so-called TPA, which describes a thermoplastic spacer, silicone foam, or a combination of several materials. The illuminable panel rests on or against the intermediate hollow chamber of the spacer element or the hollow profile with its longitudinal marginal edge, which intermediate hollow chamber is connected by material bridges to the at least two lateral hollow chambers, which lateral hollow chambers are spaced apart from each other, optionally the illuminable panel rests on or against an optionally inserted insulating layer, which will be described in more detail below.

At least one strip-like illumination element or an illumination element formed by a plurality of light sources arranged in a row or at a distance from one another is arranged within the intermediate hollow chamber, which illumination element in the activated state illuminates the marginal edge of the illuminable panel and/or radiates into the marginal edge of the illuminable panel, whereby the insulating glass unit according to the invention obtains the special character of an insulating glass unit, which insulating glass unit can be illuminated uniformly and/or with effects, which effects are produced in a targeted manner. The illuminable panel can be made of organic glass or inorganic mineral glass. When using an illuminable panel made of organic material such as a suitable transparent plastic like acrylic glass or PMMA (polymethylmethacrylate) or another suitable transparent thermoplastic, the effect of these plastic materials may be used, which is that they show a refraction behavior for light coming from an illumination source that is coupled to the marginal edges, which refraction behavior leads to an diffused even radiation of the entire panel surface with simultaneous partial loss or total loss of the transparent properties of the panel. It is also possible to form the illuminable panel from a so-called float glass (soda-lime-silica glass). Hereby, the panel can also be provided with various designs, characters, letters, logos, ornaments, etc. by 3D internal laser engraving. Such processing is not or hardly visible when viewed normally without illumination. By illuminating a marginal edge of the illuminable panel with an illumination element, such internal laser engravings become clearly luminously visible in the otherwise clear panel surface. Furthermore, it is also possible to use a safety glass for the illuminable panel.

Furthermore, the invention provides that an interior space of the intermediate hollow chamber of the spacer element of the insulating glass unit together with the at least one illumination element arranged therein is sealed or lockable in a gas-tight manner at least with respect to other sections of the insulating glass unit. Alternatively or additionally, it may also be provided that at least one section between the at least two mineral glass panels is sealed or lockable in a gas-tight manner with respect to the intermediate hollow chamber. The remaining section can be similar to a conventional insulating glass unit, in which two or three mineral glass panels are built into a frame and the internal space between the panels is sealed in a gas-tight manner, especially with greatly reduced internal pressure, for example by creating a vacuum or partial vacuum.

Optionally, i.e. additionally or instead of the gas-tight closure of the intermediate hollow chamber, the insulating glass unit according to the invention can also be designed in such a way that the interior space of the intermediate hollow chamber together with the at least one illumination element located therein is sealed in a gas-tight manner with respect to an insulated section located between the at least two mineral glass panels and/or with respect to an insulated first section located between one of the at least two mineral glass panels and the illuminable panel and/or with respect to an insulated second section located between the respective other of the at least two mineral glass panels and the illuminable panel.

With an optional embodiment of the insulating glass unit according to the invention, the intermediate hollow chamber forms a cooling profile or a cooling body. Optionally, however, it can also be provided that the intermediate hollow chamber accommodates such a cooling profile or cooling body within its interior space.

In a further embodiment of the insulating glass unit according to the invention, at least one strip-like illumination element or an illumination element formed by a plurality of light sources arranged in a row or spaced apart from one another rests on or against a side of the cooling profile or the cooling body, which side is facing the marginal edge of the illuminable panel, which illumination element in the activated state illuminates the marginal edge of the illuminable panel and/or radiates into the marginal edge of the illuminable panel.

This cooling profile or cooling body can, for example, be formed by a continuous bar or a single bar or a multiple interrupted bar, which bar is accommodated in the intermediate hollow chamber or forms part of this intermediate hollow chamber.

In particular, in a variation of the insulating glass unit, the bar forming the cooling profile or the cooling body can be a bar with a profiled cross-section. In this case, for example, it may be provided, that the bar forming the cooling profile or the cooling body is in heat-transferring contact with at least one inner side surface of the intermediate hollow chamber. This strip bar, for example, has a profile similar to a double-T profile with a U-shaped top or something alike.

According to another option, the illumination element of the insulating glass unit according to the invention rests on the cooling body or the cooling profile or is connected to the cooling body or the cooling profile via a heat-transferring layer (e.g. a tape, a suitable coating etc.). This means that in the insulating glass unit designed in this way, the illumination element is connected to a support surface of the cooling profile or the cooling body facing the illuminable panel via a heat-transferring layer.

A particular advantage of the insulating glass unit according to the invention is that the cooling body accommodated in the intermediate hollow chamber together with the at least one illumination element connected thereto and/or mounted thereon can be constructed in a modular manner, so that such a modular construction unit consisting of cooling body and illumination elements is exchangeable and/or displaceable in the longitudinal direction and/or removable from the intermediate hollow chamber and can be easily and quickly detachably mounted or fitted within the intermediate hollow chamber.

For this purpose or in this context it may be provided, for example, that the modular unit consisting of cooling body and illumination elements can be removed through an opening in the front of the intermediate hollow chamber or can be inserted into the intermediate hollow chamber.

The closure of the module or of the modularly constructed illumination module with cooling body in a gas-tight manner with respect to the remaining section of the insulating glass unit, in particular with respect to the internal spaces in between the panels, can be combined in a particularly advantageous manner with interchangeability, if the opening located at least on one side at one of two end faces of the intermediate hollow chamber can be opened and closed, in particular after insertion of the respectively desired module and/or after its replacement by another module.

At least one of the lateral hollow chambers of the spacer element of the insulating glass unit according to the invention can optionally have a box-shaped or rectangular cross-section. Optionally, the spacer element can be constructed symmetrically to a plane running through the longitudinal axis to the extent that the lateral hollow spaces or hollow chambers are symmetrically constructed or designed. In this embodiment, the glass panels, which are spaced from each other by the spacer element, are thus each at the same distance from the intermediate hollow chamber with the illumination element arranged within.

An optional embodiment of the insulating glass unit according to the invention may provide, that a cross-sectional width of the intermediate hollow chamber is smaller than the total cross-sectional width of the spacer element, which total cross-sectional width is defining the distance of the at least two mineral glass panels from each other. A variant of the insulating glass unit is also conceivable, in which the cross-sectional width of the intermediate hollow chamber comprises about 30% to about 80% of the total cross-sectional width of the spacer element, which total cross-sectional width is defining the distance between the at least two mineral glass panels. A variant of the insulating glass unit that is useful in practice can, for example, provide a cross-sectional width of the intermediate hollow chamber, which intermediate hollow chamber is hollow chamber-shaped and being equipped with a rectangular cross-section or a square cross-section, which cross-sectional width is approximately half as wide as or slightly wider than the spacer element.

However, a further sensible embodiment of the insulating glass unit can also provide a cross-sectional width of the intermediate hollow chamber, which cross-sectional width corresponds to a total cross-sectional width of the spacer element defining the distance between the at least two mineral glass panels from each other, so that a continuous width of the entire spacer element together with the intermediate hollow chamber forming a part of the spacer element is approximately the same. With such an embodiment, it can be advantageous, if the mineral glass panels are not mounted directly on the lateral sides of the spacer element or on its two outer hollow chambers and/or on the intermediate hollow chamber, but that strip-shaped or box-shaped or cuboid spacer elements are arranged each between the mineral glass panels and the respective lateral hollow chambers. Furthermore, the spacers can basically be made of any material such as aluminum, plastic, chrome-nickel steel, thermoplastic material (e.g. so-called TPA—so-called thermoplastic spacers), silicone foam, or a combination of several materials. Spacers made of thermoplastic material or such TPA can, for example, be applied directly during the assembly of the glass panels or during the assembly of the insulating glass unit according to the invention by a suitable injection process.

The variation of the insulating glass unit or spacer element mentioned last is particularly aimed at a so-called "warm edge" solution. This solution is based on the consideration that in insulating glass construction such spacers significantly contribute to the overall performance of multiple-panel insulating glass with regard to thermal insulation. The heat conduction of the spacers is specified in the form of the "PSI value", which tells the length-related heat transmission. If spacers made of aluminum profile are used, a comparatively unfavorable PSI value must be accepted, which can be around 0.111 W/mK. In contrast, comparatively favorable PSI values in the range of about 0.035 W/mK to about 0.042 W/mK can be achieved with more modern spacer systems. An important aspect of the last-mentioned variation lies in a reduction of the profile to the "core sector", whereby both lateral chambers are omitted or at least reduced in volume to such an extent that the total width of the spacer element corresponds to the cross-sectional width of the intermediate hollow chamber with the illumination element located therein—possibly with an associated cooling body. In the insulating glass production using modern equipment, a so-called "TPA" can then be applied on the resulting free side surfaces of such a core profile (spacer; spacer element), for example, which TPA is a so-called thermoplastic spacer. Such TPA can be applied directly during the assembly of the glass panels, for example, by using a spraying technique. In principle, conventional commercial spacer systems made of any material such as aluminum, plastic, chrome-nickel steel, thermoplastic material, silicone foam, or a combination of several materials can also be used.

Furthermore, an optionally understandable embodiment of the insulating glass unit according to the invention can provide that the inner sides of the at least two lateral hollow chambers, which inner sides are facing the illuminable panel and having opposing and/or parallel surfaces, together with an upper side of the intermediate hollow chamber form a U-shaped and/or groove-like receptacle or a U-shaped groove in cross-section for the illuminable panel (formed, for example, by a Plexiglas panel or by a PMMA panel).

In the case of the insulating glass unit, the illuminable panel may be embedded in the U-shaped and/or groove-like receptacle and/or be in positive and/or adhesive contact with the inner sides of the lateral hollow chambers via lateral damping layers and/or adhesive layers.

Furthermore, in the case of the insulating glass unit according to the invention, the illuminable panel may be embedded in the U-shaped and/or groove-like receptacle and/or be in positive contact with the upper side of the intermediate hollow chamber via a transparent damping layer on the underside. This transparent damping layer located on the underside, on which the panel may be supported at the marginal edge, may in particular form a sealing cover for the intermediate hollow chamber located below it, so that openings for the passage of light located therein, which light is radiated into the panel by the illumination element, if necessary, are sealed in a gas-tight manner and/or hermetically sealed. The insulating glass unit according to the invention can thus be designed in such a way that the transparent damping layer located on the underside seals the intermediate hollow chamber in a gas-tight manner with respect to the insulated section located between the at least two mineral glass panels and/or with respect to the insulated first section located between one of the at least two mineral glass panels and the illuminable panel and/or with respect to the insulated second section located between the respective other of the at least two mineral glass panels and the illuminable panel.

The insulating glass unit can also be designed preferably or optionally in such a way that the upper side of the intermediate hollow chamber, which is facing the marginal edge of the illuminable panel resting there, is provided with recesses for the passage of the light radiation emitted by the illumination element, e.g. electromagnetic light radiation, to the panel and/or for its entry into the panel, by which, in particular, it can be meant, that the material bridge, on which the panel or Plexiglas panel rests, is provided with suitable recesses for the passage of the light, which light is emitted by the illumination unit on demand. These recesses can be formed, for example, by boreholes or other breakthroughs, which are arranged in a regular pattern and/or at regular distances from each other in the longitudinal direction of the spacer element. This can mean, for example, regular and/or regularly spaced openings or circular breakthroughs or the like, which allow light to pass through. Alternatively, the apertures or openings can also be arranged in an irregular arrangement and/or at irregular distances from each other in the longitudinal direction of the spacer element. Alternatively, instead of circular or otherwise designed breakthroughs, longitudinal slits or a continuous longitudinal slit can be provided.

In the case of the insulating glass unit according to the invention, the entire profile may be formed by a metal extrusion material, in particular by an aluminum extrusion material. The cooling body can, for example, also be formed by such an extruded aluminum material. For the cooling body other materials can also be used, as long as these materials can dissipate the heat that is generated by the lights or the illumination unit in the activated state to a sufficient extent.

Alternatively, the entire profile can also be formed by a non-metallic material, in particular by a plastic extrusion material or by a material made of fiber-reinforced plastic or the like, in which case the cooling body can also be formed, for example, by such an aluminum extrusion material or by a profile made of another suitable material. In some cases, profiles made of a metal-plastic combination may also be suitable.

The entire profile can be provided on all four sides of an insulating glass unit, which insulating glass unit is used as a window or as a building boundary. However, it may also be sufficient to anchor the illuminable panel on only one side in the manner described, e.g. at its lower marginal edge. Preferably, however, the illuminable panel is held in corresponding profile sections on two opposite sides—i.e. top and bottom or left and right—but it may be sufficient to provide illumination only on one side, so that further frame sections of the insulating glass unit may be designed differently from those described above, especially with a simplified profiling, as some components such as illumination and cooling body etc. may be omitted.

In summary or in other words, the present invention can be characterized as follows. The aim is to provide and implement a technical solution for the installation of a light panel within a multi-panel insulating glass, which means in particular a solution for the "integration of a light panel made of plastic in a multi-panel insulating glass element". An important aspect hereby is a special profile that can be used as a spacer for the production of a multi-panel insulating glass panel with an almost conventional glass structure and gas filling.

A transparent panel, for example a plastic panel, can be held in a central groove of the special profile, which panel can be illuminated through openings in the profile base by an illumination, preferably in the form of LED illumination points or illumination strips or the like. These openings are covered in a gas-tight manner with a transparent material, for example by gluing the transparent plastic panel to the base of the profile. In an additional profile cavity, for example, the LED illumination used hereby is accommodated. The angle connectors are in a split form, so that the LED rail can be installed after assembly and gas filling of the insulating glass unit. In the same way, the LED rail can also be replaced without having to interfere with the hermetically sealed space inbetween the panels of the insulating glass unit.

The light panel or illuminable panel itself is typically no innovative component in this development, but may, in particular, be formed by an already commercially available product. The essence of the illumination panel is that the panel is basically clear and transparent like glass, but when the marginal edges are illuminated, it begins to "shine" over the entire surface. As a purely precautionary measure, it should be pointed out here that the outer glass panels or sheets, each of which is referred to as a mineral glass panel, may in principle also be made of plastic glass or may consist of organic glass. Therefore, if at any point in this description and in the claims the term "mineral glass panel" is mentioned, this term may also be replaced by "glass panel(s)" or by "plastic glass panel(s)" or by "glass panel(s) made of organic material" (such as PMMA or similar plastic material) or, in principle, by "glass panel(s) made of inorganic material", without this influencing, altering or even affecting the actual core idea of the present invention.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged to facilitate an understanding of the invention.

FIGS. 2A to 2H each show assembly steps of individual components of an insulating glass unit according to FIG. 1A or 1B.

FIGS. 4A to 4H each show assembly steps of individual components of an insulating glass unit according to FIG. 3.

FIG. 4E* to 4H* show alternative assembly steps of individual components of an insulating glass unit according to FIG. 3.

Figure 1A:
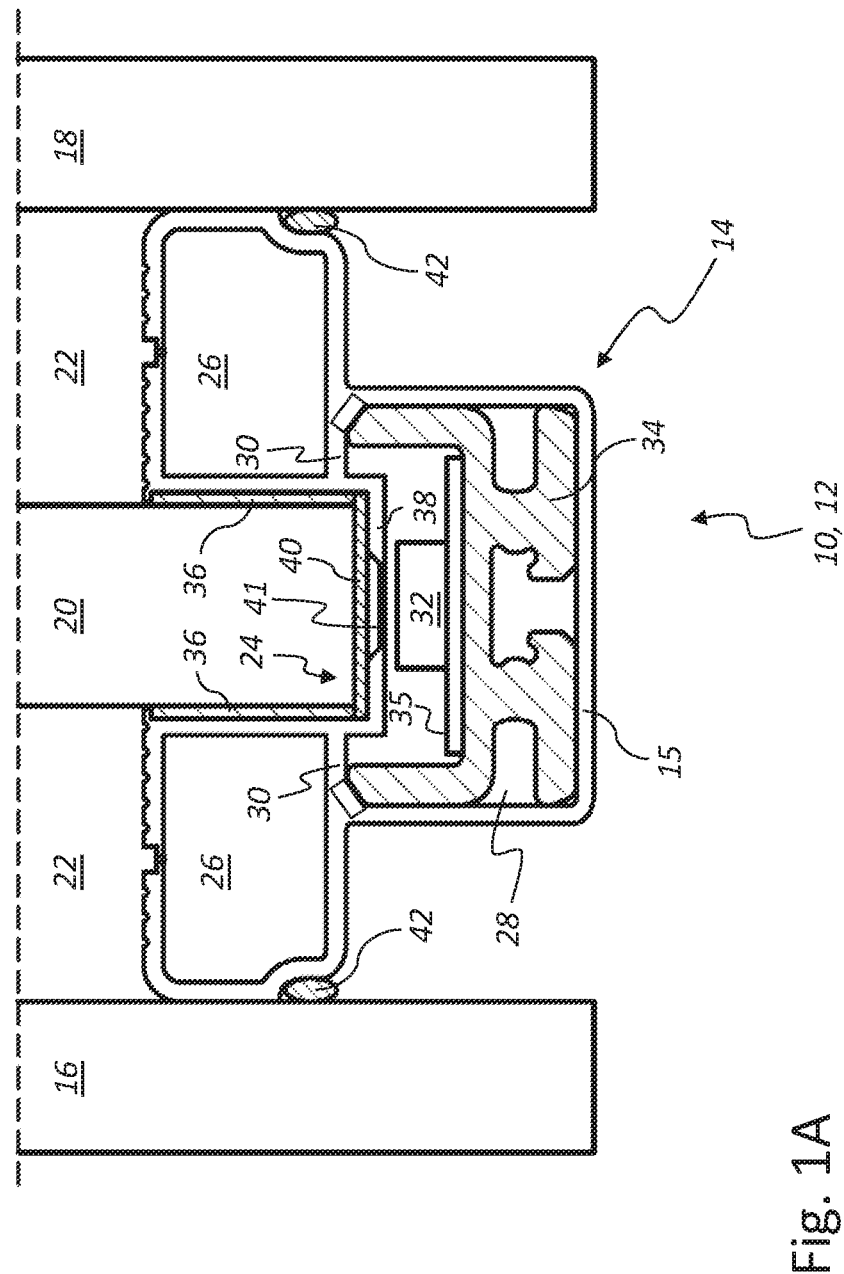
FIG. 1A shows a schematic cross-section through a partial section of a first embodiment of an insulating glass unit according to the invention.

The same or equivalent elements of the invention are designated by identical reference characters in FIGS. 1A, 1B, FIGS. 2A to 2H, FIG. 3 and FIGS. 4A to 4H or 4E* to 4H*. Furthermore, and for the sake of clarity, only the reference characters relevant for describing the respective figure are provided. It should be understood, that the embodiments described here are only examples describing an embodiment of the device according to the invention or the method according to the invention. They are not intended to limit the scope of the disclosure. It should therefore be emphasized at this point that the exemplary embodiments described here on the basis of the figures are relatively specific and objective and are in no way intended to diminish or restrict the abstract idea of the invention laid down in the claims and defined in the general part of the description in the most varied embodiments.

DETAILED DESCRIPTION OF THE INVENTION

Figure 1B:
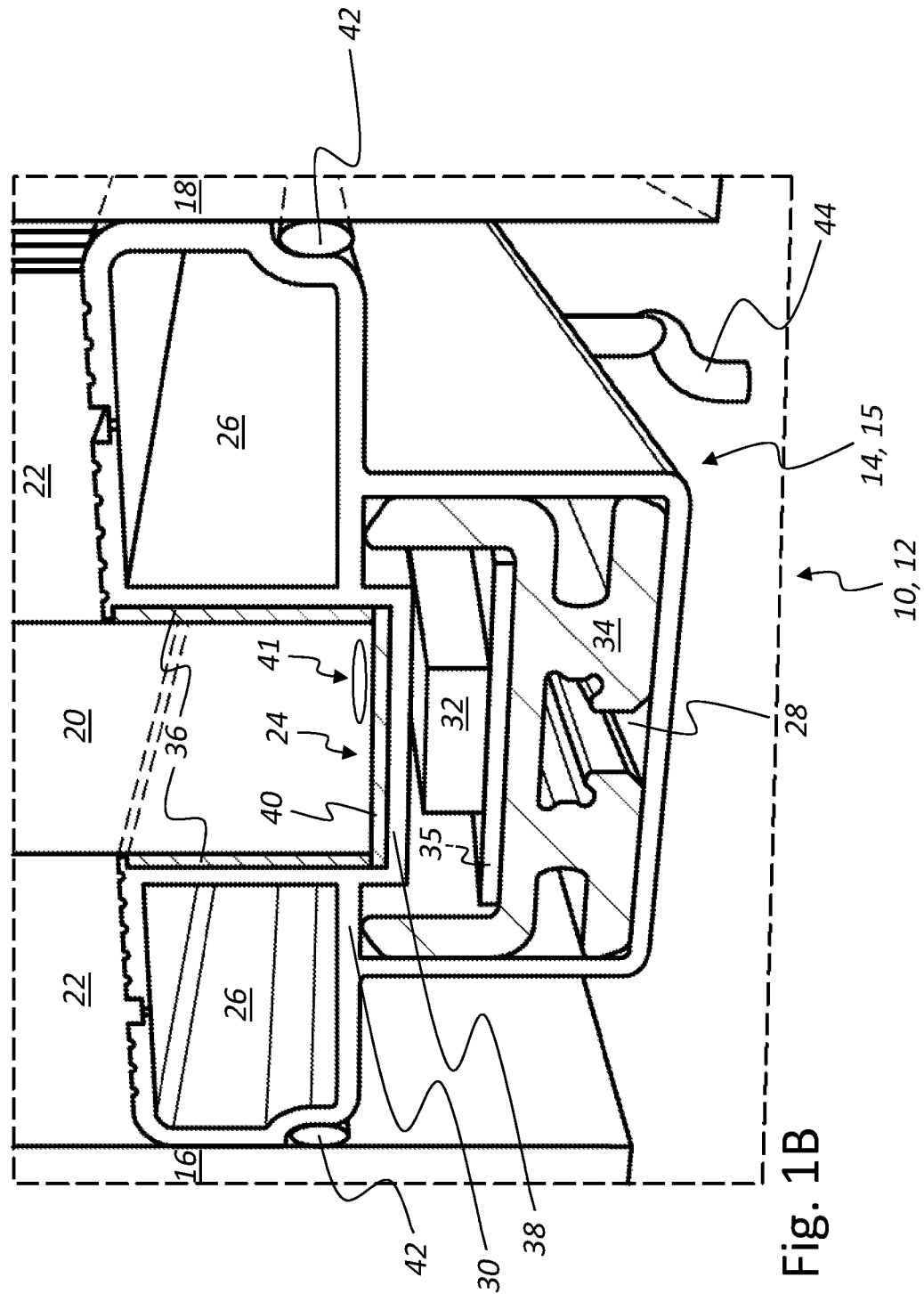
FIG. 1B shows a schematic perspective view of the partial section of the insulating glass unit shown in FIG. 1A.

The schematic cross-section of a partial section of a first embodiment of an insulating glass unit 10 according to the invention as shown in FIG. 1A illustrates the structure of a lower frame section 12, which can be continued in the same or similar manner on lateral and upper frame sections (not shown here). FIG. 1B shows the first embodiment of the insulating glass unit 10, which is shown in FIG. 1A in cross-section, in a perspective view, which is cut free in a transverse direction of the lower frame section 12 and the transparent layers connected to it.

The first embodiment of the insulating glass unit 10 according to the invention, which is shown in FIGS. 1A and 1B, and which consists of a plurality of transparent layers, provides for an illuminable panel 20 of transparent material to be arranged between two mineral glass panels 16 and 18, which two mineral glass panels 16 and 18 are held at a defined distance from each other by a spacer element. The spacer element 14 can be made thoroughly of a material such as metal or plastic. Alternatively, material combinations can also be suitably used. In particular, the two mineral glass panels 16 and 18 may be made of a so-called float glass, whereas the illuminable panel 20 arranged between them is preferably made of an organic glass such as PMMA, so that it can function as an illumination panel by external light irradiation. In principle, the use if inorganic glass for the illuminable panel 20 is also possible.

The internal spaces 22 in between the first mineral glass panel 16 and the second mineral glass panel 18 or between the two outer float glass panels 16 and 18 or between the first mineral glass panel 16 and the illuminable panel 20 and/or between the second mineral glass panel 18 and the illuminable panel 20 are sealed in a gas-tight manner by the structure described below, whereby in particular a vacuum and/or a noble gas filling or the like can be situated in the internal spaces 22 in between the panels.

The illuminable panel 20, which is located between the two mineral glass panels 16 and 18 and in each case at a distance therefrom, is held and/or supported at least at its lower longitudinal marginal edge 24 by or through the spacer element 14 and is stabilized in its parallel arrangement and position relative to the two mineral glass panels 16 and 18, the latter also being positioned in parallel arrangement to one another and being held on the spacer element 14. The spacer element 14, which defines the distance between the two mineral glass panels 16 and 18, is formed by a hollow profile 15, which profile 15 comprises several adjacent hollow chambers 26 and 28. The two lateral hollow chambers 26 of the hollow profile 15 are each adjoined by one of the two outer mineral glass panels 16 and 18, respectively, which are closely fitting. Optionally, a desiccant can be introduced within each of the lateral hollow chambers 26. The illuminable panel 20 with its longitudinal marginal edge 24 rests on the intermediate hollow chamber 28 of the spacer element 14, which intermediate hollow chamber 28 is connected by material bridges 30 to each of the two lateral hollow chambers 26, which lateral hollow chambers 26 are spaced apart from each other.

At least one strip-like illumination element 32 or an illumination element 32 made of a plurality of illumination sources arranged in a row or spaced apart from one another is located within the intermediate hollow chamber 28, which illumination element 32 in an activated state illuminates the marginal edge 24 of the illuminable panel 20 and/or radiates into the marginal edge 24 of the illuminable panel 20, whereby the insulating glass unit 10 according to the invention obtains the special character of an insulating glass unit 10, which insulating glass unit 10 can be illuminated uniformly and/or with specifically producible effects. The illuminable panel 20 consists, for example, of organic material such as a suitable transparent plastic such as acrylic glass or PMMA, which has a refraction behavior for light coming from the illumination source 32, which light is coupled in at the marginal edges, thereby resulting in a uniform diffuse radiation over the entire panel surface with simultaneous partial loss or total loss of the transparent properties of the panel 20. It is also possible to use an illuminable panel 20 made of inorganic material, such as float glass, which can also be illuminated from the marginal edges with the illumination source 32.

The illumination element 32, which may be formed, for example, by an LED strip, is mounted on a profiled cooling body 34, typically with the interposition of a heat-transferring adhesive strip 35 or a heat-transferring layer.

An internal space of the intermediate hollow chamber 28 of the spacer element 14 of the insulating glass unit 10 together with the illumination element 32 located therein is sealed in a gas-tight manner. The remaining section can be similar to a conventional insulating glass unit, in which remaining section the two mineral glass panels are installed in a frame and in which the internal space located in between the panels is sealed in a gas-tight manner, especially under greatly reduced internal pressure, for example by creating a vacuum or a partial vacuum therein and/or by introducing a noble gas filling.

In its lower part the illuminable panel 20 is held and inserted largely without play between the parallel wall sections of the lateral hollow chambers 26 by a flocking layer 36. The lower longitudinal marginal edge 24 of the transparent panel 20, which rests on the upper side 38 of the intermediate hollow chamber 28, is separated from the upper side 38 by a transparent film strip 40, which is glued or otherwise attached to the upper side 38 and ensures the sealing of the interior of the intermediate hollow chamber 28 in a gas-tight manner with respect to the internal space 22 in between panels or with respect to the two internal spaces 22 in between panels. This makes sense because the upper side 38 is provided with a number of lined up breakthroughs 41, which breakthroughs 41 serve as light passages for coupling the light emitted by the illumination element 32 into the lower marginal edge 24 of the transparent panel 20. Thus, the transparent film strip 40 also ensures the covering of these breakthroughs 41 in a gas-tight manner, so that a transparent, gas-diffusion-tight profile base can be produced by the film strip 40.

Sealing tapes 42, which may be formed, for example, by butyl sealing tapes, are located in the lower corner sections of the outer side walls of the two lateral hollow chambers 26 each, so that the mineral glass panels 16 and 18 adjacent to the lateral hollow chambers 26 are sealed to the outside and a primary seal can be formed. In combination with the spacer element 14 and the film strip 40, hermetically sealed internal spaces 22 in between panels can be ensured.

The modular unit consisting of cooling body 34 with adhesive strip 35 stuck to it and an illumination element 32 located on top, can be serviced and replaced, if necessary, via removable corner angles not shown here, without impairing the function of the insulating glass. The removable corner angles do not have to seal the intermediate hollow chamber 28 in a gas-tight manner in the assembled state, because the upper section of the insulating glass unit 10 with the internal spaces 22 in between panels is sealed in a gas-tight manner against the intermediate hollow chamber 28. FIG. 1B as well as FIG. 2 also each shows an electric supply line 44 providing the power supply for the illumination element 32.

FIGS. 2A to 2H each partially show different assembly steps of individual components of the insulating glass unit 10 according to FIGS. 1A and 1B. As an example, the assembly of the insulating glass unit 10 according to the invention is shown by a lower corner section, whereby, however, for the assembly of other corner sections a corresponding course of action of assembly may result. In a first step shown in FIG. 2A, the spacer element 14 is constructed by joining a first hollow profile section 15a and a second hollow profile section 15b by an angled connecting element 54. Preferably, the first hollow profile section 15a and the second hollow profile section 15b, joined together by the connecting element 54, form an angle of around 90° to each other. In principle, other angular values can also be provided between the hollow profile sections 15a and 15b, depending on the desired design of the insulating glass unit 10. For a stable connection of the hollow profile sections 15a, 15b to the connecting element 54, the connecting element 54 has several arms 50, which arms 50 can engage in box-shaped or even rectangular openings 58 of the respective hollow chambers 26 of the hollow profile sections 15a, 15b.

In a further step, which can be seen in FIG. 2B, the illuminable panel 20 is now to be inserted largely free of play into a free section 52 between the parallel wall sections of the two lateral hollow chambers 26 of the hollow profile sections 15a, 15b, so that the illuminable panel 20 is held and/or supported by or through the spacer element 14. Hereby, the illuminable panel 20 should rest on the intermediate hollow chamber 28 of the spacer element 14 with its respective marginal edges 24. For this purpose, the inner sides of the at least two lateral hollow chambers 26, which are facing the illuminable panel 20 and which have opposing and/or parallel surfaces, together with an upper side of the intermediate hollow chamber 28 can form in cross-section a U-shaped and/or groove-like receptacle 52 or a U-shaped groove 52 for the illuminable panel 20. The illuminable panel 20 can also be fixed or embedded in its intended position, for example, with the aid of a previously mentioned flocking layer 36. In addition, a transparent film strip 40 can be glued to the upper side 38 of the intermediate hollow chamber 28, in order to later ensure a gas-tight seal of the interior of the intermediate hollow chamber 28.

After that the sealing tapes 42, formed for example by butyl sealing tapes, can be applied to the lower corners of the outer side walls of the lateral hollow chambers 26 of the spacer element 14 (see FIG. 2C). Finally, it is possible to position the mineral glass panels 16, 18 in parallel arrangement to each other on the spacer element 14, as shown in FIG. 2D. Hereby, it is intended, to mount the mineral glass panels 16, 18 under contact with the sealing tapes 42 to the spacer element 14, so that the mineral glass panels 16, 18 abutting the sealing tapes 42 are each sealed in relation to the outside.

Figure 2E:
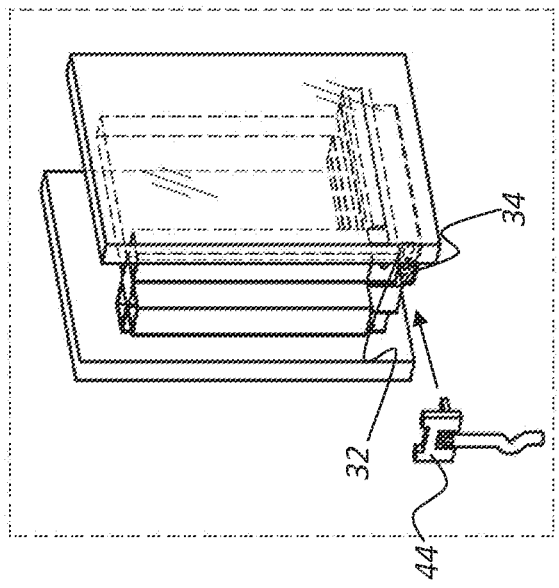
Figure 2F:
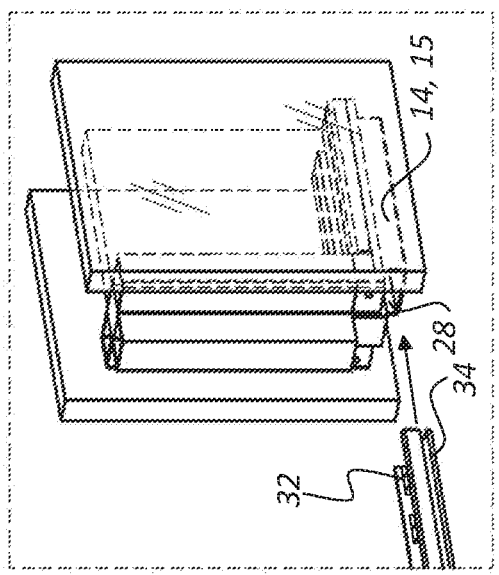
Figure 2G:
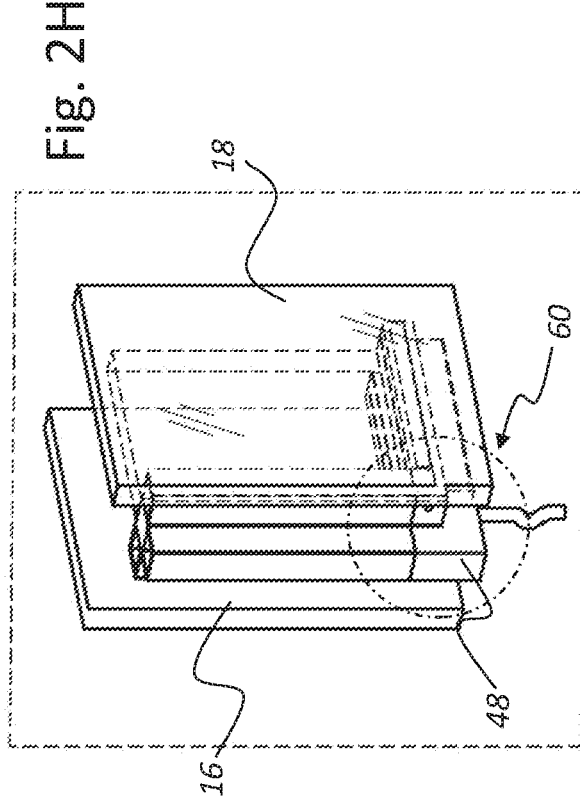
Figure 2H:
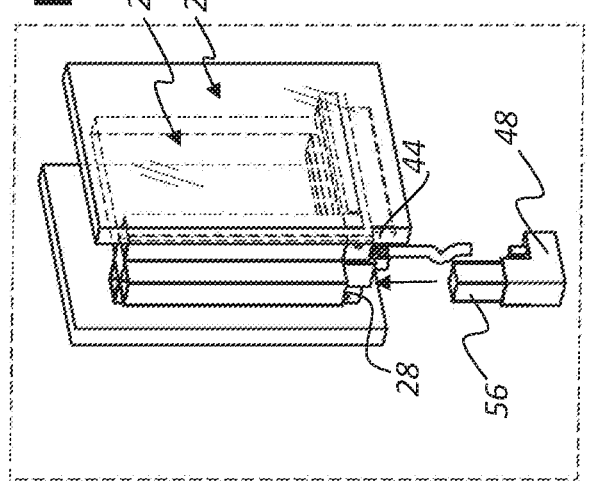

Furthermore, a illumination element 32, which is formed, for example, by an LED strip, can be mounted on a profiled cooling body 34, preferably with the interposition of a heat-transferring adhesive strip 35 or a heat-transferring layer, so that the two elements 32, 34 can be inserted together into an interior space of the intermediate hollow chamber 28 of the spacer element 14 (FIG. 2E). It may already be sufficient to integrate an illumination element 32 only within the intermediate hollow chamber 28 of one of the hollow profile sections 15a, 15b, but the arrangement of several illumination elements 32 within several hollow profile sections 15a, 15b is also possible without any problems. When activated, the illumination element 32 can illuminate the respective marginal edge 24 of the illuminable panel 20 or can radiate into the marginal edge 24 of the illuminable panel 20. For this purpose, several breakthroughs 41 may be provided on the upper side 38 of the intermediate hollow chamber 28, which are intended to serve as light passages for coupling the light emitted by the illumination element 32 into the respective marginal edge 24 of the illuminable panel 20. An interior of the intermediate hollow chamber 28 of the spacer element 14 together with the illumination element 32 located within can be sealed in a gas-tight manner as described in the following.

In a further step (FIG. 2F), an electric supply line 44 for the power supply of the illumination element 32 is electrically connected to the illumination element 32. Finally a corner angle 48 is attached to the spacer element 14 (see FIG. 2G). Here, arms 56 of the corner angle 48 project into the hollow chambers 28 of the hollow profile sections 15a, 15b and close the corner sections of the spacer element 14. The removable corner angles 48 do not have to seal the intermediate hollow chamber 28 of the hollow profile sections 15a, 15b in the assembled state in a gas-tight manner, as the upper section of the insulating glass unit 10 with the internal spaces 22 in between panels is already sealed in a gas-tight manner with respect to the intermediate hollow chamber 28. As FIG. 2H now clearly shows, the section 60 of the corner angle 48 is freely accessible. The removable corner angle 48 can thus be removed from the connection with the hollow profile sections 15a, 15b at any time, in order to remove the cooling body 34 from the intermediate hollow chamber together with the adhesive strip 35 stuck to it and the illumination element 32 located on top and to maintain or replace it if required. Also, the electric supply line 44 can be reached by the removal of the corner angle 48. The other components of the insulating glass unit, such as the illuminable panel and the mineral glass panels 16, 18, do not have to be dismantled, so that the internal spaces sealed in a gas-tight manner, for example the internal spaces 22 in between panels, can remain untouched and the function of an insulating glass unit is not impaired.

Figure 3:
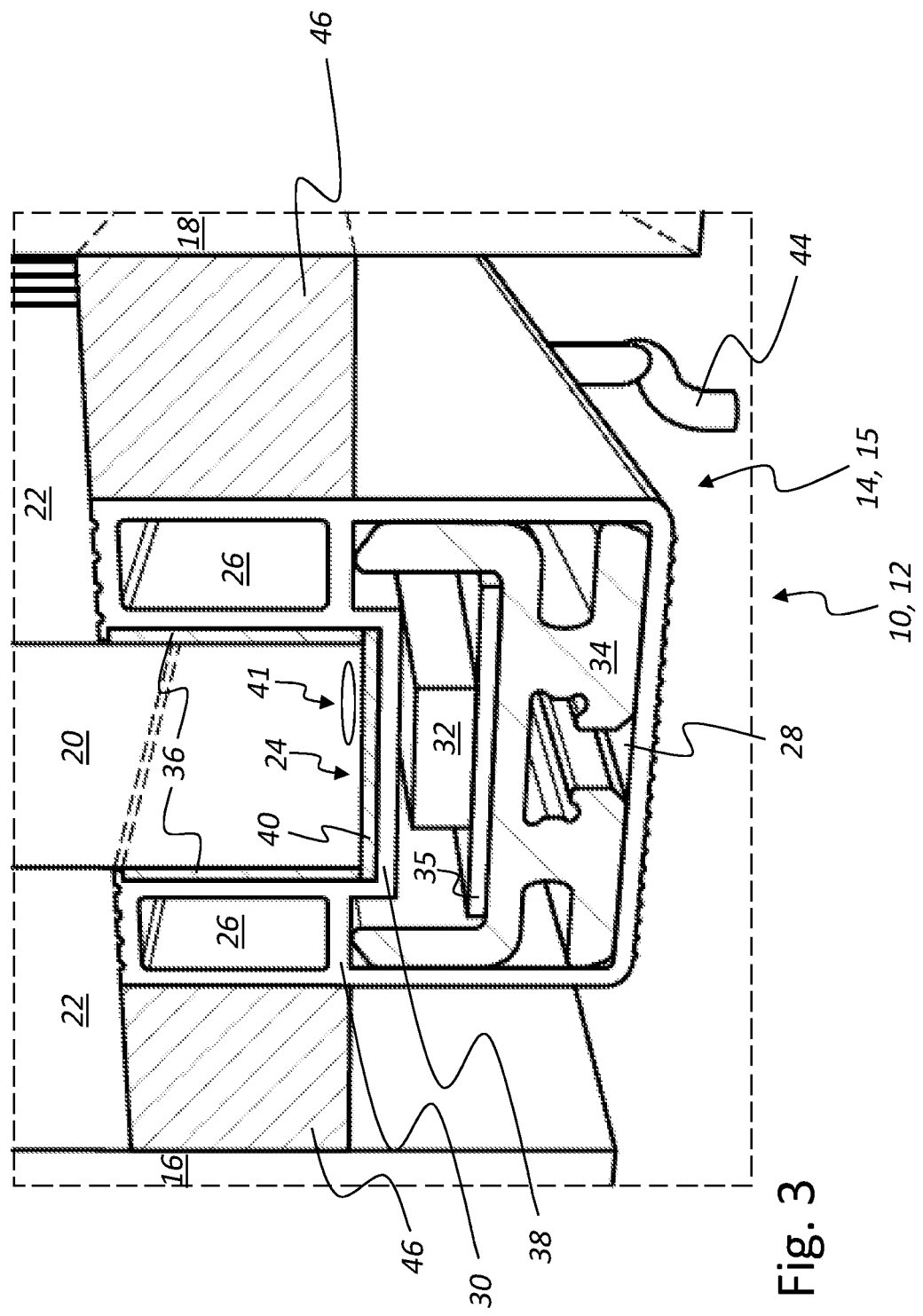
FIG. 3 shows a schematic perspective view through a partial section of a second embodiment of the insulating glass unit according to the invention.

The second embodiment of the insulating glass unit 10 shown in FIG. 3 differs from the first embodiment shown in FIGS. 1A and 1B essentially in the different design of the two lateral hollow chambers 26, which are designed to be narrower, so that they are largely aligned vertically with the intermediate hollow chamber 28. The spacer element 14 thus has a width that extends over the intermediate hollow chamber 28 and the lateral hollow chambers 26 arranged above it. Lateral spacers 46, such as thermoplastic spacers 46, ensure the gas-tight connection of the two mineral glass panels 16 and 18 respectively, while the two sealing tapes 42 (see FIG. 1A, FIG. 1B) are not required. Ideal results were achieved in particular by using thermoplastic spacers 46. In principle, conventional commercial spacer systems 46 made of any material such as aluminium, plastic, chrome-nickel steel, silicone foam or a combination of several materials can also be used.

For both embodiment variations it is applicable that the illumination unit 32 formed by an LED strip, can, for example, be maintained and replaced via removable corner angles, which corner angles can be pushed into the front of the profiles 15 without impairing the function of the insulating glass. The requirements for an insulating glass (fogging proof, transparency and gas tightness) are always guaranteed.

The spacer profile 15 is basically independent of the material used and can be made of metal, plastic or a combination of both.

FIGS. 4A to 4H now also partially show different assembly steps of individual components of the insulating glass unit 10 according to FIG. 3. Again, in a first step (see FIG. 4A) the spacer element 14 should be constructed here by joining a first hollow profile section 15a and a second hollow profile section 15b by an angled connecting element 54. The first hollow profile section 15a and the second hollow profile section 15b, which are joined together by the connecting element 54, preferably form an angle of about 90° between each other, whereby in this case, too, other angle amounts may in principle also be provided between the hollow profile sections 15a and 15b. For a stable connection of the hollow profile sections 15a, 15b to the connecting element 54, the connecting element 54 has several arms 50, which arms 50 can engage in the box-shaped or rectangular openings 58 of the respective hollow chambers 26 of the hollow profile sections 15a, 15b. In contrast to the insulating glass unit 10 shown in FIGS. 2A to 2H, the lateral hollow chambers 26 are designed to be narrower, so that they are largely aligned vertically with the intermediate hollow chamber 28.

Furthermore, in the step shown in FIG. 4B, the illuminable panel 20 is inserted as far as possible without play into a free section 52, a receptacle 52 or a groove 52 between the wall sections of the two lateral hollow chambers 26 of the hollow profile sections 15a, 15b, which wall sections are also parallel here, so that the illuminable panel 20 is held and/or supported by or through the spacer element 14. Hereby too, the illuminable panel 20 should rest on the intermediate hollow chamber 28 of the spacer element 14 with its respective marginal edge 24. In addition, the illuminable panel 20 can be fixed or embedded in its intended position, for example, again with the aid of a flocking layer 36. A transparent film strip 40 can be glued to the upper side 38 of the intermediate hollow chamber 28, which should ensure a gas-tight seal of the interior of the intermediate hollow chamber 28.

Now, as FIG. 4C shows, an illumination element 32, which again is formed e.g. by an LED strip, and which is mounted on a profiled cooling body 34 with the interposition of a heat-transferring adhesive strip 35 or a heat-transferring layer, can already be inserted into the interior of the intermediate hollow chamber 28 of the spacer element 14. It may already be sufficient to integrate an illumination element 32 just within the intermediate hollow chamber 28 of one of the hollow profile sections 15a, 15b. Nevertheless, the arrangement of several illumination elements 32 within several hollow profile sections 15a, 15b is also possible. Here, too, the interior of the intermediate hollow chamber 28 of the spacer element 14, together with the illumination element 32 within, is to be sealed in a gas-tight manner as described in the following. In a further step (FIG. 4D), the electric supply line 44 for the power supply of the illumination element 32 is electrically connected to the illumination element 32.

Figure 4E:
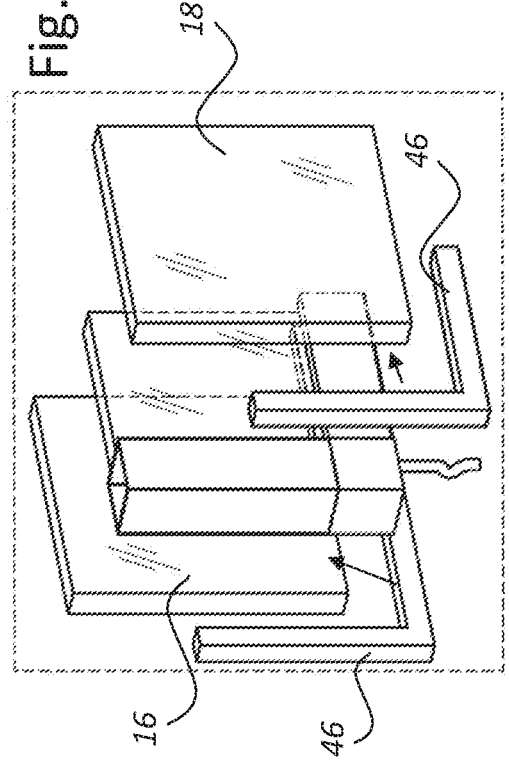

Now the corner angle 48 can be attached to the spacer element 14, whereby arms 56 of the corner angle 48 engage in the hollow chambers 28 of the hollow profile sections 15a, 15b and close the corner sections of the spacer element 14 (FIG. 4E). Even in this case the removable corner angles 48 in their assembled state do not have to seal the intermediate hollow chamber 28 of the hollow profile sections 15a, 15b in a gas-tight manner, as the upper section of the insulating glass unit 10 with the internal spaces 22 in between panels, which internal spaces will be created later, is already sealed in a gas-tight manner with respect to the intermediate hollow chamber 28.

Figure 4F:
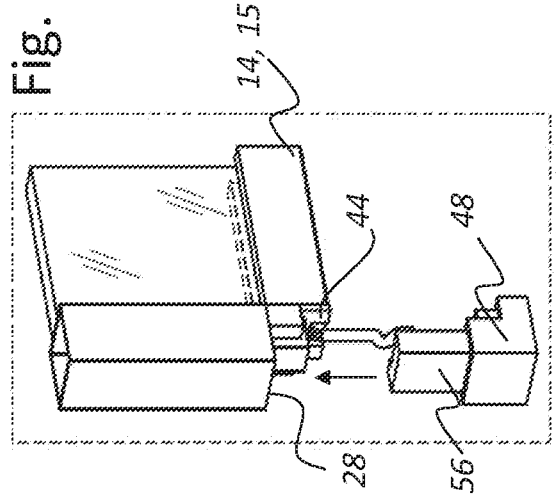
Figure 4G:
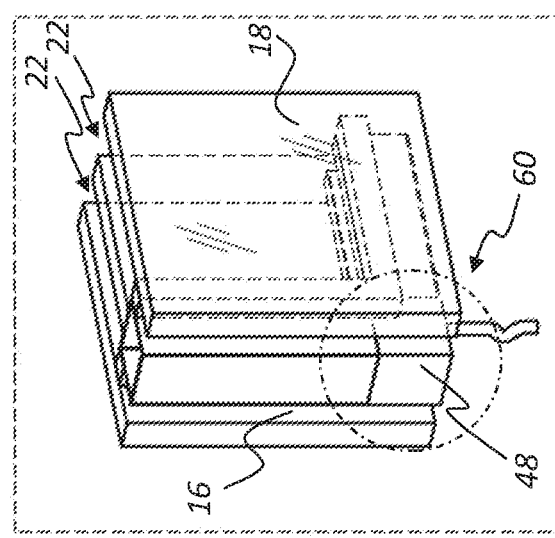

As FIG. 4F shows, lateral spacers 46, preferably thermoplastic spacers 46, can now be attached to the mineral glass panels 16, 18. Then the mineral glass panels 16, 18, together with the spacers 46 attached to them, are applied to the outer side walls of the respective hollow profile sections 15a, 15b of the spacer element 14 (FIG. 4G). Here, it is planned to position the mineral glass panels 16, 18 in parallel arrangement to each other at the spacer element 14 too. By arranging the mineral glass panels 16, 18 equipped with the spacer 46 in such a way, the mineral glass panels 16, 18 are also sealed with respect to the outside.

Figure 4H:
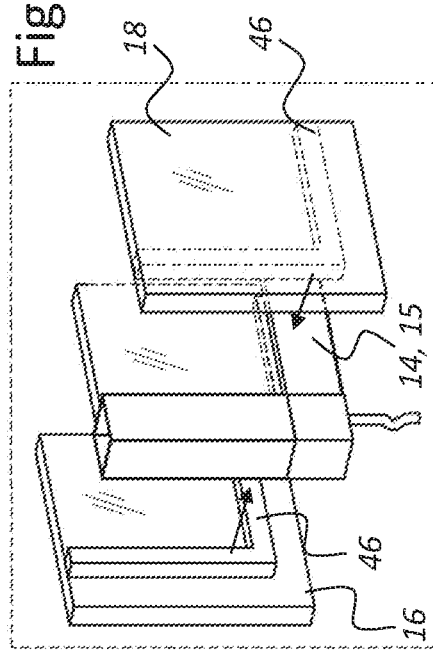
Figure 4E:
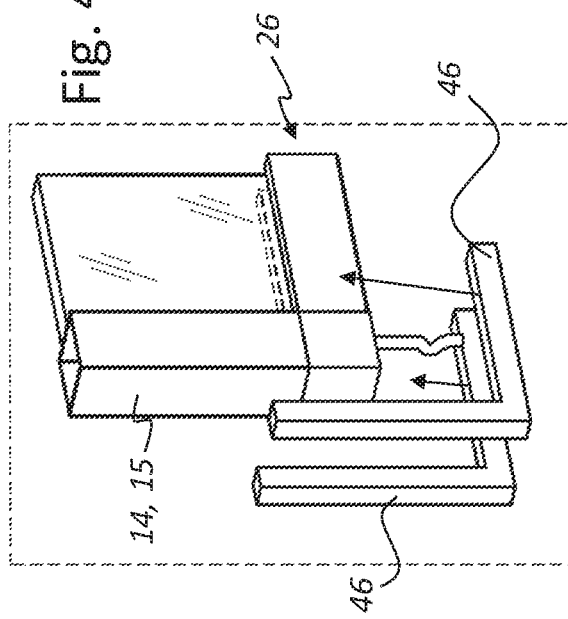
Figure 4F:
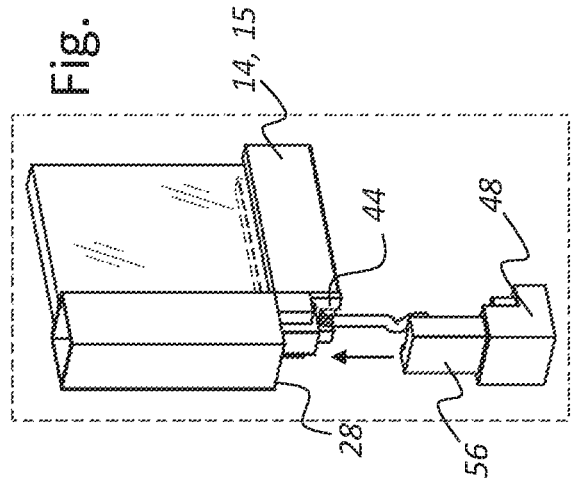
Figure 4G:
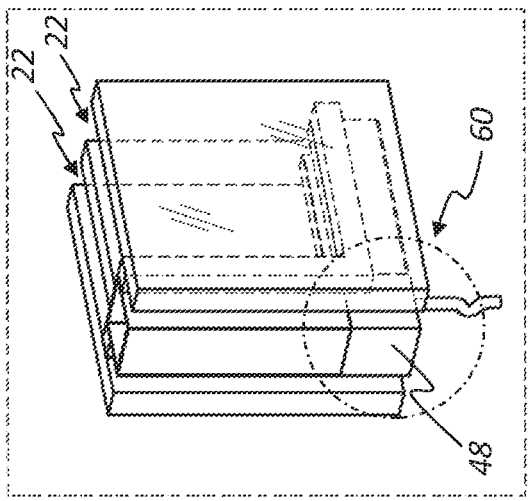
Figure 4H:
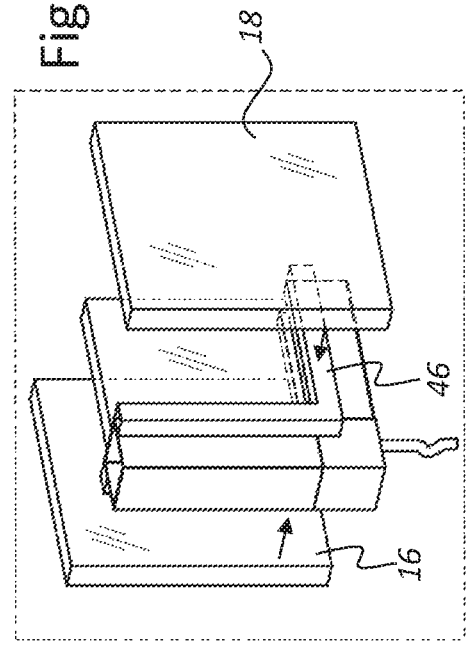

FIG. 4H clearly shows that even in this design variation, the section 60 of the corner angle 48 is freely accessible. The removable corner angle 48 can be removed from the connection with the hollow profile sections 15a, 15b at any time in order to remove the cooling body 34 together with the adhesive strip 35 stuck to it and the illumination element 32 located on top from the intermediate hollow chamber and to maintain or replace it, if required. Also, by the disassembly of the corner angle 48 the electric supply line 44 can be reached. Hereby, too, the other components of the insulating glass unit, such as the illuminable panel and the mineral glass panels 16, 18, do not have to be dismantled; thereby interspaces sealed in a gas-tight manner, for example the internal spaces 22 in between panels, can remain untouched and the function of an insulating glass is not impaired.

FIGS. 4E* to 4H* now show alternative installation steps that can be used instead of the procedure shown in FIGS. 4E to 4H. First of all, the corner angle 48 is to be attached to the spacer element 14 by engaging the arms 56 of the corner angle 48 within the hollow chambers 28 of the hollow profile sections 15a, 15b and thus closing the corner sections of the spacer element 14 (FIG. 4E*). Then spacers 46, preferably thermoplastic spacers 46, are attached laterally to the hollow profile sections 15a, 15b or to the spacer element 14 within the range of the hollow chambers 26 (see FIG. 4F*). As FIG. 4G* shows, the mineral glass panels 16, 18, can then be attached to the spacer element 14 in parallel arrangement. Hereby, it is intended to mount the mineral glass panels 16, 18 to the spacer element 14 contacting the spacers 46, so that the mineral glass panels 16, 18 abutting the spacers 46 are sealed with respect to the outside.

As FIG. 4H* now clearly shows, the section 60 of the corner angle 48 is freely accessible. The removable corner angle 48 can therefore be removed from the connection with the hollow profile sections 15a, 15b at any time, in order to remove the cooling body 34 together with the adhesive strip 35 stuck thereto and the illumination element 32 located on top from the intermediate hollow chamber and to service or replace it, if required. Accordingly, the disassembly of the corner angle 48 allows for the reachability of the electric supply line 44. Again, the other components of the insulating glass unit, such as the illuminable panel as well as the mineral glass panels 16, 18 do not have to be dismantled, so that spaces sealed in a gas-tight manner, for example the internal spaces 22 in between panels, remain untouched and the function of an insulating glass is not impaired.

LIST OF REFERENCE SIGNS

10 insulating glass unit
12 frame section
14 spacer element
15 hollow profile
15a, 15b hollow profile section
16 mineral glass panel
18 mineral glass panel
20 illuminable panel
22 internal space in between panels
24 longitudinal edge/marginal edge
26 hollow chamber
28 hollow chamber
30 material bridge
32 illumination element, illumination source
34 cooling body
35 heat-transferring adhesive strip
36 flocking layer
38 upper side of the intermediate hollow chamber
40 transparent film strip
41 breakthroughs
42 sealing tapes
44 electric supply line
46 spacer
48 corner angle
50 arm
52 free section, receptacle, groove
54 connecting element
56 arm
58 openings
60 section of the corner angle

I claim:

1. An insulating glass unit (10) comprising at least one illuminable panel (20) made of a transparent material arranged between at least two mineral glass panels (16, 18), wherein the mineral glass panels (16, 18) are held at a distance from one another by at least one spacer element (14), wherein the illuminable panel (20) is held or supported at least on one longitudinal marginal edge (24) by the spacer element (14), the spacer element (14) is formed by at least one hollow profile (15), the hollow profile (15) comprises a plurality of hollow chambers (26, 28), wherein the at least two outer mineral glass panels (16, 18) each adjoins and/or bears against at least two lateral surfaces of the hollow profile (15), and wherein the illuminable panel (20) rests on or against an intermediate hollow chamber (28), the intermediate hollow chamber (28) is connected by material bridges (30) to at least two lateral hollow chambers (26) that are spaced apart from one another, wherein at least one illumination element (32) is arranged within the intermediate hollow chamber (28), the illumination element (32) illuminates the marginal edge (24) or radiates into the marginal edge (24) in an activated state, and wherein an interior space of the intermediate hollow chamber (28) together with the at least one illumination element (32) located therein is sealed or sealable in a gas-tight manner, or wherein at least one internal space (22) located between the at least two mineral glass panels (16, 18) is sealed or sealable in a gas-tight manner against the intermediate hollow chamber (28).

2. The insulating glass unit (10) of claim 1, wherein the interior space of the intermediate hollow chamber (28) together with the at least one illumination element (32)

located therein is sealed off in a gas-tight manner with respect to an internal space (22) located between the at least two mineral glass panels (16, 18) and/or in which it is sealed off in a gas-tight manner with respect to an insulated first section located between one of the at least two mineral glass panels (16, 18) and the illuminable panel (20) or with respect to an insulated second section located between the respective other of the at least two mineral glass panels (16, 18) and the illuminable panel (20).

3. The insulating glass unit (10) of claim 2, wherein the intermediate hollow chamber (28) forms a cooling profile or a cooling body (34) or accommodates such a cooling profile or such a cooling body (34) within its interior space.

4. The insulating glass unit (10) of claim 3, wherein the illumination element (32) is connected to a support surface of the cooling profile or the cooling body (34) via a heat-transferring layer (35), which support surface is facing the illuminable panel (20).

5. The insulating glass unit (10) of claim 4, wherein the cooling body (34) accommodated in the intermediate hollow chamber (28) together with the at least one illumination element (32) connected thereto or mounted thereon is of modular construction.

6. The insulating glass unit (10) of claim 5, wherein the modular construction can be removed from or inserted into the intermediate hollow chamber (28) through an opening located at a front side of the intermediate hollow chamber (28).

7. The insulating glass unit (10) of claim 6, wherein the opening can be closed in a gas-tight manner.

8. The insulating glass unit (10) of claim 5, wherein the modular constructional construction is mounted or mountable within the intermediate hollow chamber (28) interchangeable or displaceable in the longitudinal direction or removable therefrom.

9. The insulating glass unit (10) of claim 3, wherein the at least one illumination element (32) rests on or against a side of the cooling profile or the cooling body (34), facing the marginal edge (24).

10. The insulating glass unit (10) claim 9, wherein the cooling profile or the cooling body (34) is formed by a continuous bar or an interrupted bar, which bar is accommodated in the intermediate hollow chamber (28) or forms part of this intermediate hollow chamber (28).

11. The insulating glass unit (10) of claim 10, wherein the bar forming the cooling profile or the cooling body (34) is a bar profiled in cross-section.

12. The insulating glass unit (10) of claim 11, wherein the bar forming the cooling profile or cooling body (34) is in heat-transferring contact with at least one inner side surface of the intermediate hollow chamber (28).

13. The insulating glass unit (10) of claim 1, wherein inner sides of the at least two lateral hollow chambers (26), facing the illuminable panel (20) and are having opposing or parallel surfaces, together with an upper side (38) of the intermediate hollow chamber (28) form a receptacle (52) for the illuminable panel (20).

14. The insulating glass unit (10) of claim 13, wherein the illuminable panel (20) is in positive contact with an upper side (38) of the intermediate hollow chamber (28) via a transparent film strip (40).

15. The insulating glass unit (10) of claim 14, wherein the transparent film strip (40) closes off the intermediate hollow chamber (28) in a gas-tight manner.

16. The insulating glass unit (10) of claim 13, wherein the illuminable panel (20) is in positive contact with the inner sides of the lateral hollow chambers (26) via lateral damping layers.

17. The insulating glass unit (10) of claim 1, wherein an upper side (38) of the intermediate hollow chamber (28) comprises recesses (41) that allow the passage of electromagnetic light radiation into the illuminable panel (20), the electromagnetic light radiation is emitted by the illumination element (32).

18. The insulating glass unit (10) of claim 17, wherein the recesses (41) are arranged at regular distances from one another in a longitudinal direction of the spacer element (14).

19. The insulating glass unit (10) of claim 1, wherein the at least one hollow profile (15) is formed by a non-metallic material.

20. The insulating glass unit (10) of claim 19, wherein the at least one hollow profile (15) is formed by a plastic extrusion material or a fiber-reinforced plastic material.

21. The insulating glass unit (10) of claim 1, wherein at least one of the at least two lateral hollow chambers (26) has a rectangular cross-section.

22. The insulating glass unit (10) of claim 1, wherein a width of the intermediate hollow chamber (28) is smaller than the distance between the at least two mineral glass panels (16, 18).

23. The insulating glass unit (10) of claim 1, wherein the width of the intermediate hollow chamber (28) comprises about 30% to about 80% of the distance between the at least two mineral glass panels (16, 18).

24. The insulating glass unit (10) of claim 1, wherein the width of the intermediate hollow chamber (28) and the distance between the at least two mineral glass panels (16, 18) is approximately equal.

25. The insulating glass unit (10) of claim 1, wherein one or more lateral spacers (46) are located between the mineral glass panels (16, 18) and the at least two lateral hollow chambers (26).

26. The insulating glass unit (10) of claim 1, wherein the entire profile (15) is formed by a metal extrusion profile, in particular an aluminum extrusion profile.

27. The insulating glass unit (10) of claim 1, wherein each of the at least outer mineral glass panel (16, 18) adjoins and/or bears against one of the at least two lateral hollow chambers (26).

* * * * *